United States Patent
Ha et al.

(10) Patent No.: US 11,836,603 B2
(45) Date of Patent: Dec. 5, 2023

(54) NEURAL NETWORK METHOD AND APPARATUS WITH PARAMETER QUANTIZATION

(71) Applicant: Samsung Electronics Co., Ltd., Suwon-si (KR)

(72) Inventors: SangWon Ha, Seongnam-si (KR); Junhaeng Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 16/282,748

(22) Filed: Feb. 22, 2019

(65) Prior Publication Data

US 2020/0026986 A1    Jan. 23, 2020

Related U.S. Application Data

(60) Provisional application No. 62/663,433, filed on Apr. 27, 2018.

(30) Foreign Application Priority Data

Jun. 28, 2018   (KR) .................. 10-2018-0074916

(51) Int. Cl.
G06N 3/08      (2023.01)
G06N 3/047     (2023.01)
G06N 3/04      (2023.01)

(52) U.S. Cl.
CPC ............... *G06N 3/047* (2023.01); *G06N 3/04* (2013.01); *G06N 3/08* (2013.01)

(58) Field of Classification Search
CPC ...... G06N 3/04; G06N 3/0454; G06N 3/0472; G06N 3/08
See application file for complete search history.

(56) References Cited

U.S. PATENT DOCUMENTS 5,479,574 A * 12/1995 Glier ............... G06K 9/6274
                                                    706/25
9,836,692 B1    12/2017 Gulland
(Continued)

FOREIGN PATENT DOCUMENTS

KR    10-2019-0014900 A    2/2019

OTHER PUBLICATIONS

Hwang et. al., "Fixed-Point Feedforward Deep Neural Network Design Using Weights +1,0, and −1", 2014 (Year: 2014).*
(Continued)

*Primary Examiner* — Selene A. Haedi
(74) *Attorney, Agent, or Firm* — NSIP Law

(57) ABSTRACT

A neural network method of parameter quantization obtains channel profile information for first parameter values of a floating-point type in each channel included in each of feature maps based on an input in a first dataset to a floating-point parameters pre-trained neural network, and determines a probability density function (PDF) type, for each channel, appropriate for the channel profile information based on a classification network receiving the channel profile information as a dataset. The neural network method of parameter quantization determines a fixed-point representation, based on the determined PDF type, for each channel, statistically covering a distribution range of the first parameter values, and generates a fixed-point quantized neural network based on the fixed-point representation determined for each channel.

23 Claims, 9 Drawing Sheets

(56) References Cited

U.S. PATENT DOCUMENTS

| | | | | |
|---|---|---|---|---|
| 9,916,531 | B1* | 3/2018 | Zivkovic | G06N 3/08 |
| 2005/0010632 | A1* | 1/2005 | Lei | G06F 7/5443 |
| | | | | 708/670 |
| 2016/0328645 | A1 | 11/2016 | Lin et al. | |
| 2016/0328646 | A1 | 11/2016 | Lin et al. | |
| 2016/0328647 | A1 | 11/2016 | Lin et al. | |
| 2017/0220929 | A1 | 8/2017 | Rozen et al. | |
| 2018/0349758 | A1* | 12/2018 | Pan | G06N 3/0454 |
| 2018/0365558 | A1* | 12/2018 | Sekiyama | G06N 3/084 |
| 2019/0034784 | A1* | 1/2019 | Li | G06N 3/063 |
| 2019/0042935 | A1* | 2/2019 | Deisher | G06F 5/01 |
| 2019/0042948 | A1 | 2/2019 | Lee et al. | |
| 2019/0050710 | A1* | 2/2019 | Wang | G06N 3/084 |
| 2019/0294413 | A1* | 9/2019 | Vantrease | G06F 17/15 |

OTHER PUBLICATIONS

Shah et. al., "A Fixed-Point Neural Network Architecture for Speech Applications on Resource Constrained Hardware", 2016 (Year: 2016).*

Zhou et. al. "Balanced Quantization: An Effective and Efficient Approach to Quantized Neural Networks", Jun. 2017 (Year: 2017).*

Mellempudi et al., "Ternary Neural Networks with Fine-Grained Quantization", 2017 (Year: 2017).*

Chen et al., "FxpNet: Training a deep convolutional neural network in fixed-point representation", 2017 (Year: 2017).*

Zhou et al., DoReFa-Net: Training Low Bitwidth Convolutional Neural Networks with Low Bitwidth Gradients, Feb. 2018 (Year: 2018).*

Wang et al., "Fixed-point Factorized Networks", 2017 (Year: 2017).*

Gysel, P. "Ristretto: Hardware-Oriented Approximation of Convolutional Neural Networks", *arXiv preprint arXiv,* May 20, 2016, pp. 1-73 (73 pages in English).

Lin, D et al., "Fixed Point Quantization of Deep Convolutional Networks", *Proceedings of the 33rd International Conference on Machine Learning,* vol. 48, Jun. 2, 2016, pp. 2849-2858 (10 pages in English).

Chen, Xi et al., "FxpNet: Training Deep Convolutional Neural Network in Fixed-Point Representation", *International Joint Conference on Neural Networks (IJCNN),* May 14, 2017. pp. 2494-2501 (8 pages in English).

Anonymous, "Quantization for Rapid Deployment of Deep Neural Networks", *32nd Conference on Neural Information Processing Systems,* 2018, pp. 1-9 (9 pages in English).

Courbariaux et al., "Training Deep Neural Networks With Low Precision Multiplications," Accepted as a workshop contribution at ICLR 2015, 10 pages.

Choi et al., "Towards the Limit of Network Quantization," Published as a conference paper at ICLR 2017, 14 pages.

Hubara et al., "Quantized Neural Networks: Training Neural Networks with Low Precision Weights and Activations," Journal of Machine Learning Research 18, 2018, pp. 1-30.

Zhuang et al., "Towards Effective Low-bitwidth Convolutional Neural Networks," IEEE, pp. 7920-7928.

* cited by examiner

FIG. 8

| Network | Reference (Float32) | Layer-wise MAX | MAX | Channel-wise Laplace | S.Cauchy | PDF-aware |
|---|---|---|---|---|---|---|
| GoogLeNet | 68.93% | 0.23% | 0.13% | 0.15% | 0.08% | 0.05% |
| SqueezeNet | 58.39% | 1.84% | 0.22% | 0.23% | 0.43% | 0.27% |
| MobileNet | 69.50% | 5.41% | 1.17% | 0.66% | 0.66% | 0.73% |
| MobileNet2 | 71.23% | 71.13% | 1.73% | 1.81% | 3.09% | 1.68% |
| VGG16 | 68.34% | 0.29% | -0.01% | -0.04% | 0.01% | -0.06% |
| ResNet101-v2 | 78.04% | 9.90% | 1.01% | 0.74% | 1.58% | 0.83% |
| ResNetXt50-32x4d | 76.84% | 1.63% | 0.51% | 0.65% | 0.78% | 0.32% |
| Inception-v3 | 77.97% | 0.92% | 0.23% | 0.09% | 0.18% | 0.24% |
| Inception-v4 | 79.90% | 61.6% | 26.07% | -0.06% | 0.07% | 0.13% |
| Incep.-ResNet-v2 | 80.19% | 1.37% | 0.18% | 1.11% | 0.64% | 0.36% |
| Xception | 78.72% | 54.67% | 1.11% | 0.60% | 0.48% | 0.33% |

NEURAL NETWORK METHOD AND APPARATUS WITH PARAMETER QUANTIZATION

CROSS-REFERENCE TO RELATED APPLICATIONS

This application claims the benefits of U.S. Provisional Application No. 62/663,433, filed on Apr. 27, 2018, in the US Patent Office, and Korean Patent Application No. 10-2018-0074916, filed on Jun. 28, 2018, in the Korean Intellectual Property Office, the entire disclosure of which is incorporated herein by reference for all purposes.

BACKGROUND

1. Field

The present disclosure relates to methods and apparatuses for quantizing parameters of a neural network.

2. Description of the Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, categorization, or classification in various forms. The trained capability of extracting such information or recognitions, generating such mappings, performing such pattern recognitions, or performing such categorizations or classifications may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

Such neural network implementations also require many operations for complex input data, which may require large power consumption and require long processing times.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method of quantizing parameters of a neural network, includes obtaining channel profile information for first parameter values of a floating-point type in each channel included in each of feature maps based on an input in a first dataset to a floating-point parameters pre-trained neural network; determining a probability density function (PDF) type, for each channel, appropriate for the channel profile information based on a classification network receiving the channel profile information as a dataset; determining a fixed-point representation, based on the determined PDF type, for each channel, statistically covering a distribution range of the first parameter values; and generating a fixed-point quantized neural network based on the fixed-point representation determined for each channel.

The classification network may be a neural network trained to select a PDF type determined most appropriate for determining the fixed-point representation for each channel, from among a plurality of predefined PDF types, and the method may further include training the classification network.

The training of the classification network may include obtaining profile information of second parameter values of a floating-point type used in each channel included in each of feature maps based on an input in a second dataset to the floating-point parameters pre-trained neural network; determining a candidate fixed-point representation, for each of the plurality of predefined PDF types, statistically covering the distribution range of the second parameter values; quantizing the second parameter values based on the determined candidate fixed-point representation for each of the plurality of predefined PDF types and determining an optimum PDF type corresponding to the candidate fixed-point representation having a highest signal-to-quantization-noise ratio (SQNR) based on a result of the quantization; generating a training dataset matching the profile information of the second parameter values to the optimum PDF type, and training the classification network using the training dataset.

The determining of the fixed-point representation for each of the plurality of predefined PDF types may further include determining a fractional length of the fixed-point representation to reduce a quantization error for each of the plurality of predefined PDF types when a number of bits representing the fixed-point representation is fixed.

The determining of the fixed-point representation may further include determining a fractional length of the fixed-point representation to reduce a quantization error when a number of bits representing the fixed-point representation is fixed.

The first parameter values may include activations of the floating-point type used in each channel included in each of the feature maps.

The first dataset may correspond to image samples of less than a predetermined number.

The channel profile information may include any one or any combination of two or more of an average, a variance, an expected value, a skewness, a kurtosis, a hyper-skewness, and a hyper-kurtosis of the first parameter values.

The generating of the fixed-point quantized neural network may further include: obtaining a maximum value of weights included in each kernel from data of the floating-point parameters pre-trained neural network and determining a fractional length of the fixed-point representation to represent the weights based on the obtained maximum value.

The plurality of predefined PDF types may include any one or any combination of two or more of a Laplace distribution, a hyperbolic secant distribution, a logistic distribution, a normal distribution, a raised-cosine distribution, a Wigner distribution, a uniform distribution and a super Cauchy distribution.

The method may further include performing recognition of the input using the generated fixed-point quantized neural network.

In another general aspect, an apparatus includes a processor configured to quantize parameters of a neural network by executing the at least one program. The processor is further configured to: obtain channel profile information for first parameter values of a floating-point type in each channel included in each of feature maps based on an input in a first dataset to a floating-point parameters pre-trained neural network, determine a probability density function (PDF) type, for each channel, appropriate for the channel profile information based on a classification network receiving the channel profile information as a dataset, determine a fixed-point representation, based on the determined PDF type, for each channel, statistically covering a distribution range of the first parameter values, and generate a fixed-point quantized neural network based on the determined fixed-point representation for each channel.

The classification network may include a trained neural network configured to select a PDF type determined most appropriate for determining the fixed-point representation for each channel, from among a plurality of predefined PDF types, and the processor is configured to train the classification network.

The processor may be further configured to obtain profile information of second parameter values of a floating-point type used in each channel included in each of the feature maps based on an input in a second dataset to the floating-point parameters pre-trained neural network, determine a candidate fixed-point representation statistically covering a distribution range of the second parameter values for each of the plurality of predefined PDF types, quantize the second parameter values based on the determined candidate fixed-point representation for each of the plurality of predefined PDF types and determine an optimum PDF type corresponding to the candidate fixed-point representation having the highest signal-to-quantization-noise ratio (SQNR) based on a result of the quantization, generate a training dataset matching the profile information of the second parameter values to the optimum PDF type, and train the classification network using the training dataset.

The processor may be configured to determine a fractional length of the fixed-point representation to reduce a quantization error for each of the plurality of predefined PDF types when a number of bits representing the fixed-point representation is fixed.

The processor may be configured to determine a fractional length of the fixed-point representation to reduce a quantization error with fixed number of bits representing the fixed-point representation.

The first parameter values may include activations of a floating-point type used in each channel included in each of the feature maps.

The first dataset may correspond to image samples of less than a predetermined number.

The channel profile information may include any one or any combination of two or more of an average, a dispersion, an expected value, a skewness, a kurtosis, a hyper-skewness and a hyper-kurtosis of the first parameter values.

The processor may be configured to obtain a maximum value of weights included in each kernel from data of the floating-point parameters pre-trained neural network, and determine a fractional length of the fixed-point representation to represent the weights based on the obtained maximum value.

The plurality of predefined PDF types may further include any one or any combination of two or more of a Laplace distribution, a hyperbolic secant distribution, a logistic distribution, a normal distribution, a raised-cosine distribution, a Wigner distribution, a uniform distribution and a super Cauchy distribution.

The processor may be further configured to perform recognition of the input using the generated fixed-point quantized neural network.

The apparatus may further include a memory storing instructions, which when executed by the processor causes the processor to perform the obtaining of the channel profile information, the determining of the probability density function (PDF) type, the determining of the fixed-point representation, and the generating of the fixed-point quantized neural network.

Other features and aspects will be apparent from the following detailed description, the drawings, and the claims.

BRIEF DESCRIPTION OF THE DRAWINGS

FIG. 8 illustrates a comparison of accuracy losses when comparing results of performing quantization using one or more examples of a method of quantizing parameters for a neural network and a reference quantization method.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terms used in the present embodiments are selected in consideration of functions in the present embodiments, which are the general terms currently widely used, but the terms may vary depending on the intentions or precedents of those skilled and the emergence of new technologies. In addition, in certain cases, the meanings of the arbitrarily selected terms will be described in detail in the corresponding embodiments. Furthermore, the terms used in the present embodiments should be defined based on the meanings of the terms, the contents throughout the embodiments and an understanding after reading the disclosure, and not merely on a name of a simple term.

In the descriptions of embodiments, when a portion is connected to another portion, a direct connection is not only included, but also a case where the portions are electrically connected with other configuration components in between. In addition, when a portion is said to include a configuration component, which means other configuration components are not excluded unless specifically stated to the contrary, other components may be included.

Figure 1:
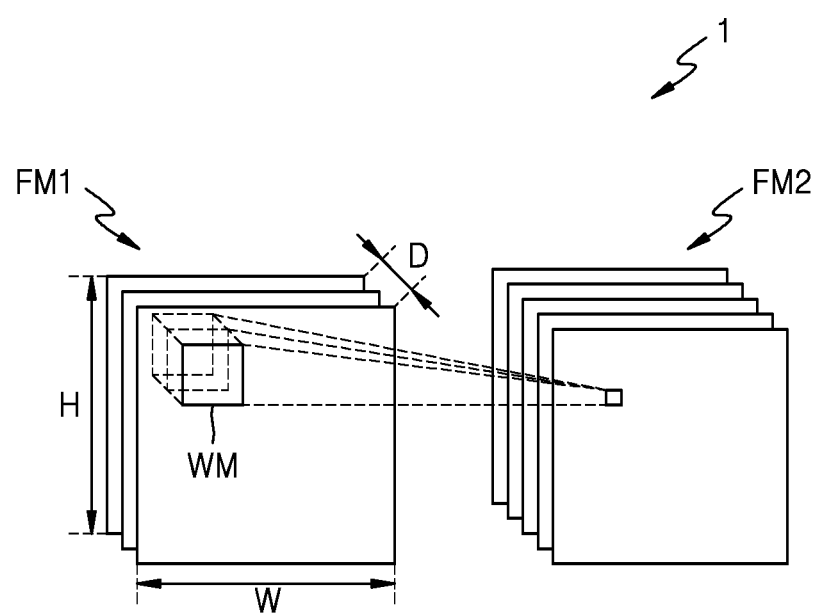
FIG. 1 illustrates one or more examples of an architecture of a computational graph.

FIG. 1 illustrates one or more examples of an architecture of a computational graph 1.

Referring to FIG. 1, the computational graph 1 represents an example of a machine learning model expressed by using nodes and edges. The architecture of the computational graph 1 may correspond to an architecture of a neural network, but various other models may also be expressed. Herein, the neural network may be the architecture of a deep neural network (DNN) or an n-layers neural network. DNN or the n-layers neural networks may correspond to convolutional neural networks (CNN), recurrent neural networks (RNN), deep belief networks, restricted Boltzmann machines, or the like. For example, the neural network may be implemented as a CNN, but the neural network is not limited thereto. In a case where the computational graph 1 of FIG. 1 represents a CNN, the computational graph 1 may correspond to some of the layers of the CNN. Therefore, the computational graph 1 may correspond to a convolutional layer, a pooling layer, or a fully connected layer of the CNN. For the sake of convenience, the following description will be made with respect to the computational graph 1 corresponding to the convolutional layer of the CNN. However, the present disclosure is not limited thereto, and the computational graph 1 may correspond to expressions of other machine learning models.

In the convolutional layer example, a first feature map 1 FM1 may correspond to an input feature map and a second feature map 2 FM2 may correspond to an output feature map. A feature map may refer to a dataset in which various extracted features of the input data are expressed. The first and second feature maps FM1 and FM2 may be represented by high-dimensional matrices of more than two dimensions and have respective activation parameters. When the first and second feature maps FM1 and FM2 correspond to, for example, three-dimensional feature maps, the first and second feature maps FM1, and FM2 have a width W (or referred to as a column), a height H (or referred to as a row), and a depth D. The depth D may be referred to as the number of channels.

In the convolutional layer example, a convolution calculation may be performed on the first feature map FM1 and a weight map WM, and the second feature map FM2 may be generated as a result. The weight map WM may be convoluted with the first feature map FM1 and is referred to as a filter or a kernel. The depth of the weight map WM, that is, the number of channels of the weight map WM, equals to a value obtained by multiplying the depth of the first feature map FM1 by the depth of the second feature map FM2, that is, a value obtained by multiplying the number of channels of the first feature map FM1 by the number of channels of the second feature map FM2. However, when the weight map WM is a four-dimensional matrix, and the kernel size is k, the number of channels of the weight map WM may be calculated as "the depth of the first feature map FM1*the depth of the second feature map FM2*k*k". The weight map WM shifts the first feature map FM1 in a sliding window method according to a set stride. During each shift, each of the weights included in the weight map WM may be multiplied by and added to all feature values in an overlapping region with the first feature map FM1. A channel of the second feature map FM2 may be generated according to the convolution of the first feature map FM1 and the weight map WM. Although a single weight map WM is shown in FIG. 1, in fact, a plurality of weight maps may be convolved with the first feature map FM1 to generate a plurality of channels of the second feature map FM2.

The second feature map FM2 of the convolutional layer may be an input feature map of a next layer. For example, the second feature map FM2 may be an input feature map of a pooling layer, and there may be multiples of such pooling layers.

Figure 2:
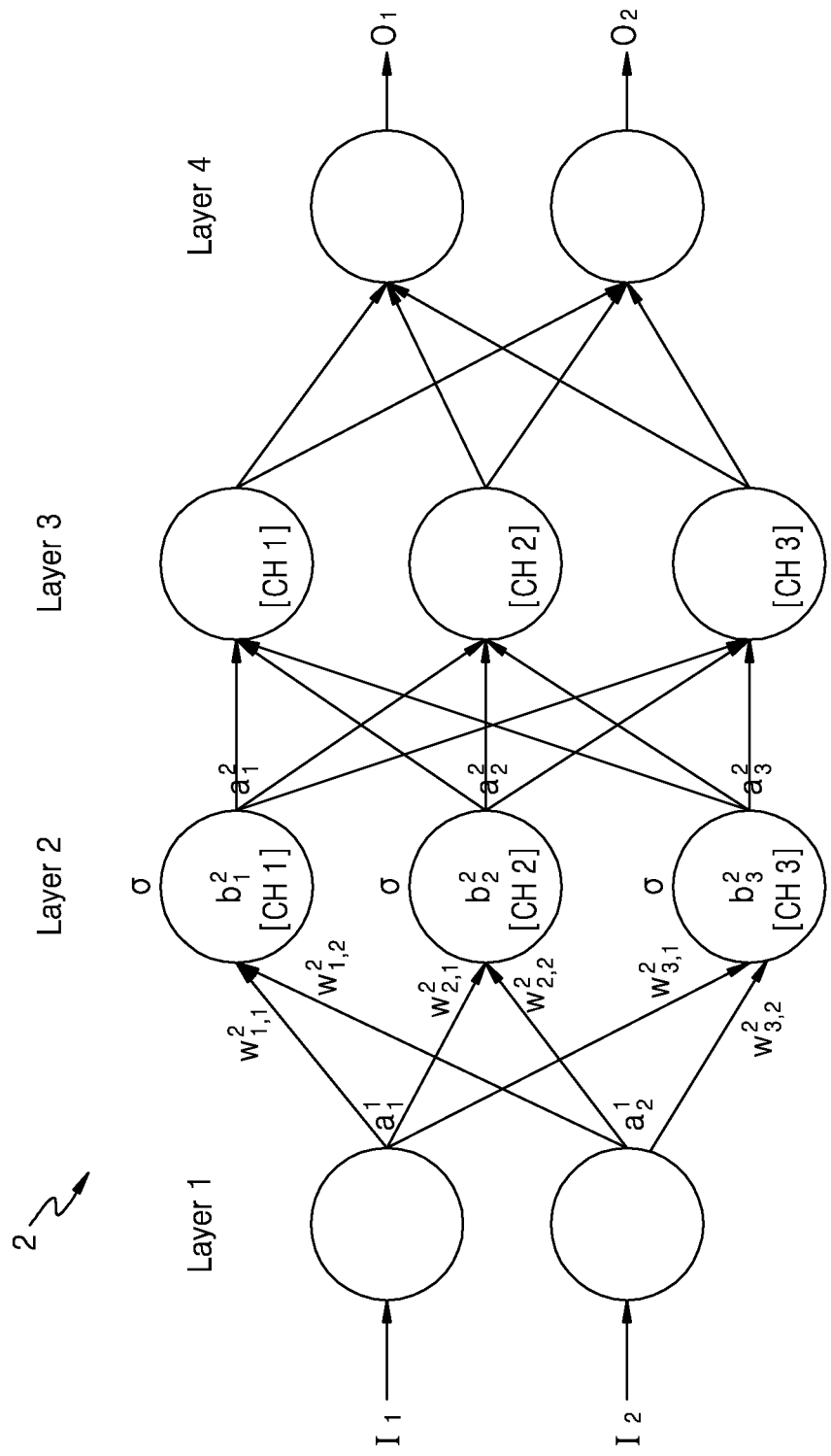
FIG. 2 illustrates one or more examples of a calculation performed in a neural network.

FIG. 2 describes an example of a calculation performed in a neural network 2.

Referring to FIG. 2, the neural network 2 has a configuration that includes an input layer, hidden layers, and an output layer. The neural network 2 performs a calculation based on received input data (e.g., $I_1$ and $I_2$) to generate output data (e.g., $O_1$ and $O_2$) based on a result of the calculations. Accordingly, the neural network 2 includes a plurality of layers, and each of the layers includes a plurality of nodes. Depending on the architecture of the neural network 2, nodes included within layers and/or in neighboring layers may be selectively connected according to respective connections, e.g., which may or may not be weighted. For example, the neural network 2 may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply example kernels or weighted connections within layers, to interpret input data applied to the neural network structure. As only examples, herein such an 'interpretation' of input data may include a performed recognition, verification, or rejection, or input data binary or multi-class classification, clustering, pattern observation, transformation, and/or regression, as well as any other trained objective of the neural network in various examples.

As described above, the neural network 2 may be a DNN or an n-layer neural network having two or more hidden layers. For example, as shown in FIG. 2, the neural network 2 may be a DNN having an input layer (layer 1), two hidden layers (layer 2 and layer 3), and an output layer (layer 4). In a case where the neural network 2 is implemented as a DNN architecture, the neural network 2 may include many layers capable of processing valid information and thus process complex datasets compared to a neural network having a single layer. The neural network 2 is illustrated as having four (4) layers, which is only an example. The neural network 2 may include fewer or more layers or may include fewer or more channels. That is, the neural network 2 may include layers of various configurations, which are different from those shown in FIG. 2. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Each of the layers included in the neural network 2 may have a plurality of channels. A channel may correspond to a plurality of nodes, a processing element (PE), a unit, or in similar terms. For example, as shown in FIG. 2, the layer 1 may include two channels (nodes), and the layer 2 and the layer 3 may include three (3) channels, respectively. However, FIG. 2 is only an example. Each of the layers included in the neural network 2 may include various numbers of channels (nodes). Any of the layer 2 and layer 3 may be convolution layers, recurrent, or fully connected layers. As another example, layer 2 may correspond to the convolution layer of FIG. 1, while layer 3 may be a fully connected layer.

The channels included in each of the layers of the neural network 2 may be connected to each other to process data. For example, one of the channels may receive and calculate data from other channels and output a calculated result to other channels.

The input and the output of each of the channels may be referred to as an input activation and an output activation, respectively. For example, an output value of each of the nodes may be referred to as an activation, i.e., as a respective result of one or more activation functions of a corresponding node applied with respect to at least input information to the corresponding node. The activation may be as simple as rectified linear unit (ReLU), sigmoid function, or tan h applied to the summation of multiple weighted inputs, or the nodes may be more complex, such being gated or long short-term memory nodes, as non-limiting examples. Thus, the activation may be a parameter corresponding to an output of one channel and, then also considered as inputs of the channels included in a next layer, a further subsequent layer, a previous layer, or as a recurrent input to back to channels of the current layer. Each of the channels may generate activation, based on the activations from the channels included in the previous layer and applied connection weights. The weight may be a value assigned to a connection relationship between the channels, as a parameter to be used for calculating the output activation of each of the channels. For example, the weight may be a trained parameter of the neural network that results from training of parameters of an initial or interim neural network, for example. Thus, a trained weight may be applied to a particular input (or resultant activation from a previous node/layer) to a node, with respective other trained weights being applied to other respective inputs to the node, such that the activation of the node with respect to such weighted inputs and may be a value or activation result that is then output and assigned to a connection relationship between that node and one or more next nodes. In addition to such weight parameters the neural network may also apply biases to such activations. The biases may be set or trained during the training of the neural network 10, for example.

Each of the channels may thus be processed by the nodes, as respective computational units or processing elements, which receives input and output the output activation, and the input-output of each of the channels may be mapped. For example, $\sigma$ is an activation function, $w_{jk}^{i}$ is a weight from the k-th channel included in the (i−1)th layer to the j-th channel included in the i-th layer. $b_{j}^{i}$ is a bias of the j-th channel included in the i-th layer. When $a_{j}^{i}$ is an activation of the j-th channel of the i-th layer, an activation $a_{j}^{i}$ may be calculated using the following Equation 1.

$$a_{j}^{i} = \sigma\left(\sum_{k}(w_{jk}^{i} \times a_{k}^{i-1}) + b_{j}^{i}\right) \quad \text{Equation 1}$$

As shown in FIG. 2, the activation of a first channel CH1 of the layer 2 may be expressed as $a_1^2$. In addition $a_1^2$ may have a value of $a_1^2 = \sigma(w_{1,1}^2 \times a_1^1 \times w_{1,2}^2 \times a_2^1 \times b_1^2)$ according to Equation 1. However, Equation 1 above is only an example for explaining the activation and the weight used for processing data in the neural network 2, which is not limited thereto. The activation may be a value obtained by passing a value applying an activation function in a sum of the activations received from the previous layer, through a rectified linear unit RELU, as discussed above.

As described above, a large number of datasets are exchanged among the plurality of mutually connected channels in the neural network 2, and a large number of calculations are performed when passing through the layers. Therefore, it is found herein that a technique that reduces the loss of accuracy while reducing the required number of calculations to process input data may be desirable.

Figure 3:
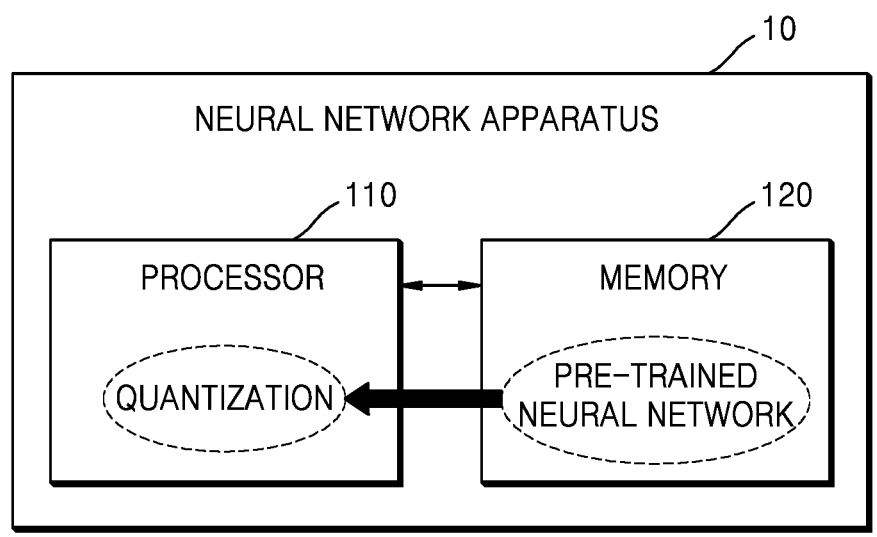
FIG. 3 is a block diagram of one or more examples of a hardware configuration of a neural network apparatus.

FIG. 3 is a block diagram of an example of a hardware configuration of a neural network apparatus.

Referring to FIG. 3, a neural network apparatus 10 includes a processor 110 and a memory 120. Only the configuration of components related to the present example is shown in the neural network apparatus 10 in FIG. 3. Therefore, apart from the configuration of components shown in FIG. 3, other general configuration of components in the neural network apparatus 10 is self-evident to those skilled in the art.

The neural network apparatus 10 may correspond to a computer device having various processing functions, like functions of generating a neural network, training (or learning) the neural network, quantizing a neural network of a floating-point type into a neural network of a fixed-point type, or retraining the neural network. For example, the neural network apparatus 10 may be implemented as various types of devices such as a personal computer (PC), a server, a mobile device, or the like.

The processor 110 performs all functions for controlling the neural network apparatus 10. For example, the processor 110 generally controls the neural network apparatus 10, by executing programs stored in the memory 120 in the neural network apparatus 10. The processor 110 may be implemented as a central processing unit (CPU), a graphics processing unit (GPU), or an application processor (AP) included in the neural network apparatus 10, but the present disclosure is not limited to thereto.

The memory 120 is hardware configured to store various data to be processed in the neural network apparatus 10; for example, the memory 120 may store data processed and data to be processed in the neural network apparatus 10. In addition, the memory 120 may store applications and drivers, or the like, which are to be driven by the neural network apparatus 10. The memory may further store trained parameters of the neural network, as well as initial and interim parameters when performing the training of the neural network. The memory 120 may be DRAM, but the memory 120 is not limited thereto. The memory 120 may include at least one of a volatile memory or a nonvolatile memory. The nonvolatile memory includes read only memory (ROM), programmable ROM (PROM), electrically programmable ROM (EPROM), electrically erasable and programmable ROM (EEPROM), a flash memory, PRAM, magnetic RAM (MRAM), resistive RAM (RRAM), and ferroelectric RAM (FeRAM), or the like. The volatile memory includes DRAM, static RAM (SRAM), synchronous DRAM (SDRAM), PRAM, MRAM, RRAM, and ferroelectric RAM (FeRAM). In an embodiment, the memory 120 may include at least one of a hard disk drive (HDD), a solid state drive (SSD), a COMPACTFLASH® (CF) card, a Secure Digital (SD) card, a Micro Secure Digital (Micro-SD) card, a Mini Secure Digital (miniSD) (mini-SD) card, an eXtreme Digital Picture (xD-Picture) card, or a memory stick.

The processor 110 may generate a trained neural network, by repeatedly training (learning) a given initial neural network. For example, a pre-trained neural network may be generated by training the given initial neural network. At this time, the initial neural network may have parameters of the floating-point type, for example, parameters of a 32-bit floating-point precision, for ensuring a processing accuracy of the neural network. Herein, the parameters may include various types of data input/output to/from the neural network, such as input/output activations, weights, and biases. The floating-point parameters of the neural network may be tuned to calculate a more accurate output with respect to a given input, according to the progress of repetitive training of the neural network.

However, floating-point type operations require a relatively great number of calculations and a large number of memory access frequency when compared with fixed-point operations. Particularly, most of the number of calculations required for the processing of a neural network is known as the convolution calculation, which performs the calculation of various parameters. Therefore, in a mobile device which has relatively low processing performance, such as a smartphone, a tablet, a wearable device, or an embedded device, the processing operations of a neural network in floating-point type operations may be problematic. As a result, to drive the neural network with acceptable accuracy loss while sufficiently reducing the number of calculations in such devices, the parameters of the floating-point type to be processed in the neural network may be desirably quantized. Herein, a parameter quantization refers to a conversion of the parameter of the floating-point type into a parameter of the fixed-point type.

The neural network apparatus 10 may perform quantization to convert the parameters of the trained neural network into the fixed-point type of predetermined bits, considering the processing performance of a neural network deployed device (e.g., a mobile device, an embedded device, etc.) A device to be employed by the neural network may be the neural network apparatus 10 or another device outside the neural network apparatus 10. The neural network apparatus 10 provides a quantized neural network to the employed device. The neural network apparatus may be an autonomous vehicle, robotics, a Smartphone, a tablet device, an augmented reality (AR) device, and an internet of things (IoT) device, which performs speech recognition and image recognition using the neural network, as a particular example.

In an example, the operation of generating the pre-trained neural network by repeatedly training a given initial neural network may not be performed by the processor 110. For example, the pre-trained neural network may be generated by a separate external device instead of the neural network apparatus 10 including the processor 110, according to the repeated training of the initial neural network, wherein the processor 110 may receive the pre-trained, i.e., previously trained, neural network from the external device. In an embodiment, the processor 110 may receive the pre-trained neural network generated by a server, from the server.

The processor 110 may store the pre-trained neural network in the memory 120. For example, the processor 110 may generate the pre-trained neural network by learning the initial neural network directly and then store the resultant pre-trained neural network in the memory 120 or may receive the pre-trained neural network from outside and then store the pre-trained neural network in the memory 120.

The processor 110 obtains data of the pre-trained neural network by using the floating-point parameters, wherein the pre-trained neural network is stored in the memory 120. The pre-trained neural network may be data repeatedly trained with the parameters of the floating-point type. The training of the neural network may be first trained repeatedly with the input of a training dataset, and then be again repeatedly trained to a test dataset, but the embodiment is not necessarily limited thereto. The training dataset is input data for training the neural network; the test dataset is input data that does not overlap with the training dataset, wherein the test dataset is data for training while measuring the performance of the neural network trained with the training dataset The processor 110 may analyze a channel's statistical distribution with respect to the parameter values of the floating-point type used in each channel included in each of the feature maps and kernels, from the pre-trained neural network data. At this time, the processor 110 may analyze the statistical distribution by obtaining the channel's statistics with respect to the parameter values of the activations, weights, and biases of the floating-point type, which are used in each channel when the neural network is being pre-trained.

The processor 110 may determine a fixed-point representation of channel parameters which statistically cover the distribution range of the parameter values, based on the analyzed statistical distribution of the channels. As a result, the neural network of the floating-point type may be converted to a neural network of a fixed-point type. According to the present embodiment, since the conversion from the floating-point type to the fixed-point type is performed based on the statistical distribution with respect to each channel, the fixed-point representation assigned to each channel may be the same or different for each channel. That is, a fractional length of the fixed-point representation of the parameter for each channel may be different.

Furthermore, the processor 110 determines the fractional lengths of the bias and the weight of the channel, based on the result of performing the convolution calculation between the feature maps and the kernels as the parameters of the fixed-point representation of the channels. In one example, the fractional length of the bias and the fractional length of the weight of the channel may set to a constraint of the quantized neural network.

In one example, the memory 120 may store, for example, the datasets related to the processed or to be processed neural network by the processor 110, such as untrained initial neural network data, neural network data generated during training, neural network data that has been fully trained, and neural network data to be quantized. In addition, various programs related to training algorithms, and quantized algorithms of the neural network to be executed by the processor 110, may be stored.

Figure 4:
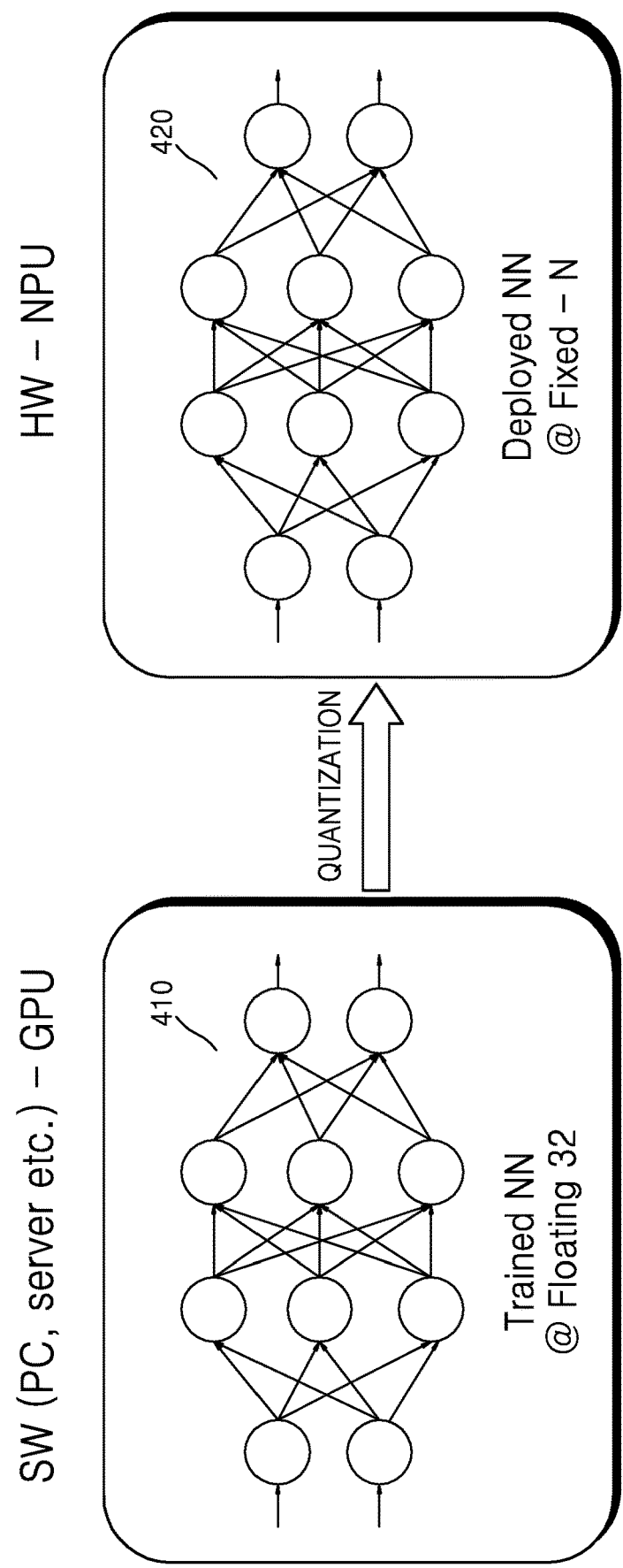
FIG. 4 illustrates an example of quantizing and employing a pre-trained neural network in a hardware accelerator.

FIG. 4 illustrates an example of quantizing and employing a pre-trained neural network in a hardware accelerator.

Referring to FIG. 4, a processor of an external device, such as a PC, a server, etc., trains a neural network of the floating-point type (for example, 32-bit floating-point type), and then transmits the trained neural network 410 to the neural network apparatus 10. However, the present embodiment is not limited to thereto, and as described above will reference to FIG. 3, the trained neural network 410 may be generated by the processor 110 of the neural network apparatus 10.

Since the pre-trained neural network 410 itself may not be efficiently handled in a low power or a low-performance hardware accelerator due to the floating-point type parameters, the processor 110 of the neural network apparatus 10 quantizes the pre-trained neural network 410 of the floating-point type into a neural network 420 of the fixed-point type (for example, a fixed-point type of less than 16 bits). The hardware accelerator is a dedicated hardware configured to drive the neural network 420 and is implemented for a relatively low power or low performance environment, which may be more suitable for the fixed-point calculation than the floating-point calculation. The hardware accelerator may correspond to, but is not limited to, a neural processing unit (NPU), a tensor processing unit (TPU), and/or a neural engine, which may be a dedicated module configured to drive the neural network.

The hardware accelerator configured to drive the neural network 420, which is quantized, may be implemented in the same apparatus as the neural network apparatus 10. However, the present embodiment is not limited thereto. The hardware accelerator may be implemented in an independent device separated from the neural network apparatus 10.

Figure 5:
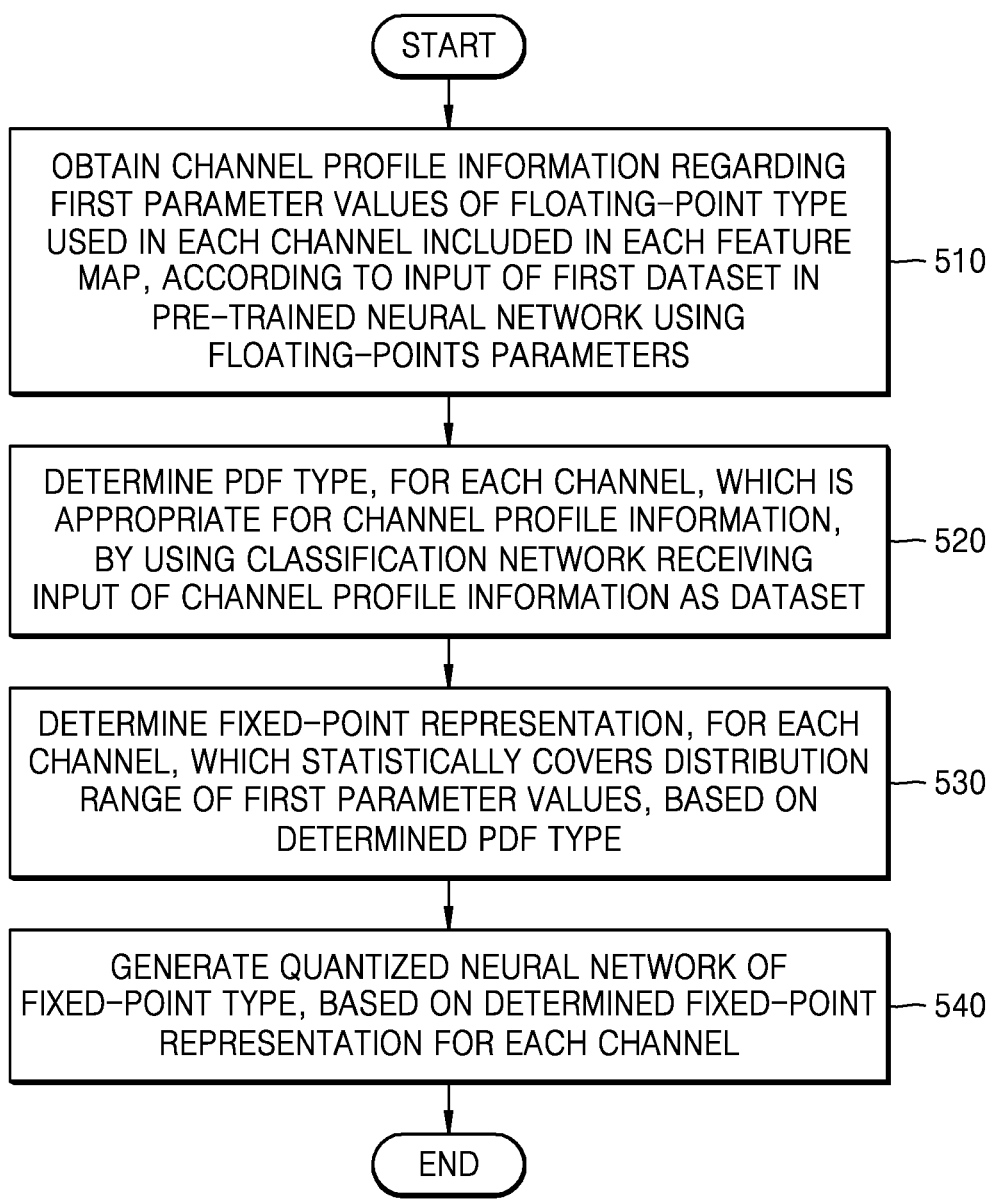
FIG. 5 is a flowchart of one or more examples of a method of quantizing parameters of a neural network.

FIG. 5 is a flowchart illustrating one or more examples of a method of quantizing parameters of a neural network. The method of FIG. 5 may be performed by the processor 110 of the neural network apparatus 10 described above.

In operation 510, the processor 110 may obtain the channel profile information regarding the first parameter values of the floating-point type used in each channel included in each of the feature maps, based on the input of the first dataset in the pre-trained neural network trained using floating-point parameters. The channel profile information may be determined, based on a network model, layer parameters, and the first dataset of the pre-trained neural network. The processor 110 may input the first dataset in the pre-trained neural network so as to obtain the first parameter values. The first dataset may be a training dataset used to train the pre-trained neural network before quantization is performed. For example, the first dataset may correspond to image samples of less than a predetermined number.

In an example, the first dataset may correspond to no more than 10 randomly selected image samples. The method of quantizing the parameters of the neural network according to the present disclosure may include performing quantization with a certain or predetermined level of accuracy or more, with only a small number of image samples, e.g., 10 or less, through particular operations that will be further described later. However, the types of samples are not limited to image samples, and there may be various types of samples including a voice sample. In addition, the corresponding example describes that the quantization may be performed with only a small number of image samples of less than 10, but the number of samples is not limited to 10 and may be arbitrarily set.

Various calculations may be performed based on the input of the first dataset to the pre-trained neural network. The first parameter values of the floating-point type used in each channel included in each of the feature maps included in the pre-trained neural network may be determined. For example, the first parameter values may be activations of the floating-point type used in each channel included in each of the feature maps.

The channel profile information may include any one or any combination of any two or more of determined average, variance, expected value, skewness, kurtosis, hyper-skewness, and hyper-kurtosis of the first parameter values. The skewness is a characteristic value indicating a direction and a degree of asymmetry related to an average value in the statistical distribution and may be determined based on a third moment about the average of the first parameter values. The kurtosis is a measure of the degree to which the statistical distribution is concentrated around a measure of spread or a degree of sharpness of the distribution, and may be determined based on a fourth moment about the average of the first parameter values. Each of the hyper-skewness may be determined based on a fifth moment, and each of the hyper-kurtosis may be determined based on a sixth moment about the average of the first parameter values. However, the examples are not limited thereto and the channel profile information may include various measurements related to the statistical distribution of the first parameter values.

In operation 520, the processor 110 may determine a probability density function (PDF) type, for each channel, which is appropriate for the channel profile information, using a classification network receiving input of the channel profile information as a dataset.

The classification network may refer to a neural network receiving the channel profile information and outputting a PDF type. The classification network is a network different from the initial neural network and the pre-trained neural network and may be a neural network used to draw an appropriate PDF type based on the channel profile information. For example, the classification network is a neural network trained to select the determined most appropriate PDF type for being used to determine the fixed-point representation of each channel based on the channel profile information corresponding to the first datasets from pre-defined PDF types. The fact that a particular PDF type, which may be appropriate for being used to determine the fixed-point representation of each channel, may indicate that a quantization error is minimized when it is assumed that the statistical distribution of the parameter values used in the channel is the corresponding PDF type and then the quantization is performed.

In one example, the predefined PDF types may be predefined types to represent the statistical distribution of the parameter values of the floating-point type used in each channel included in each of the feature maps. Hereinafter, referring to FIG. 6, an example of predefined PDF types will now be described in detail.

Figure 6:
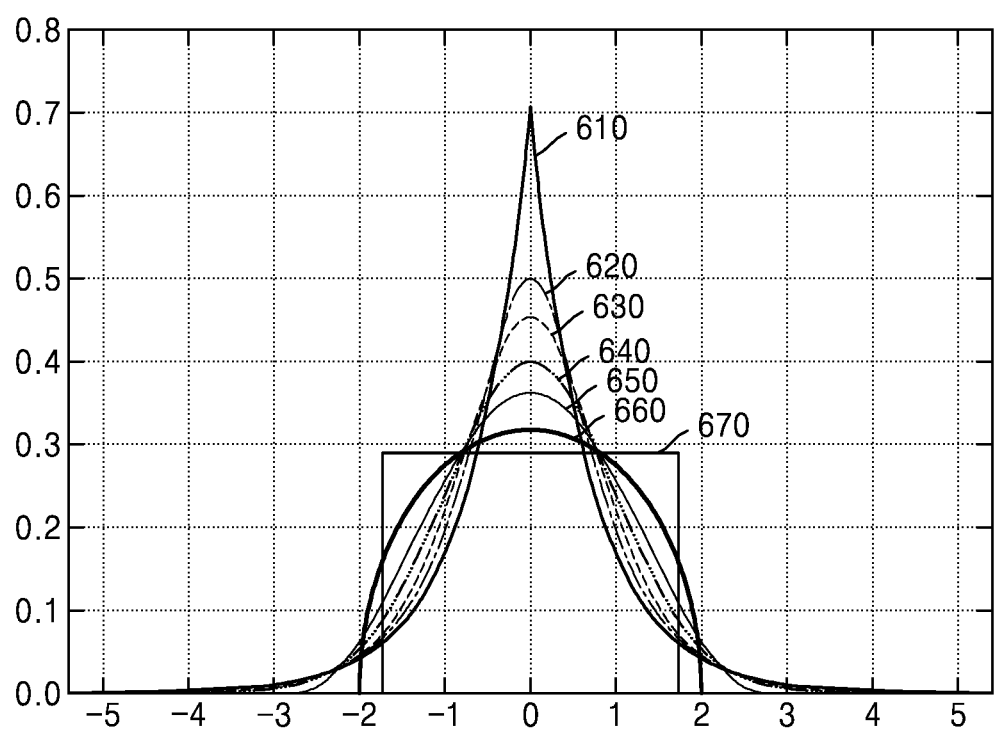
FIG. 6 is a graph showing examples of predefined PDF types according to one or more examples.

FIG. 6 is a graph illustrating examples of predefined PDF types according to one or more examples.

Referring to FIG. 6, the predefined PDF types may include any one or any combination of any two or more of a Laplace distribution 610, a hyperbolic secant distribution 620, a logistic distribution 630, a normal distribution 640, a raised-cosine distribution 650, a Wigner distribution 660, and a uniform distribution 670. However, the plurality of predefined PDF types is not limited thereto. For example, the plurality of predefined PDF types may further include various probabilistic distribution types, such as a Super Cauchy distribution.

Referring to FIG. 5 again, as an example, the processor 110 may output the determined PDF type for each channel. The processor 110 may re-train the classification network by using a dataset that matches the PDF type for each channel and the channel profile information. However, the embodiment is not limited thereto. The classification network may be trained by using a separate dataset. Hereinafter, referring to FIG. 7, a method of training the classification network will be described in further detail below with respect to FIG. 7.

In operation 530, the processor 110 may determine the fixed-point representation, for each channel, which statistically covers the distribution range of the first parameter values, based on the determined PDF type. For example, the processor 110 may determine a quantization level for quantizing the parameters of the corresponding channel to the fixed-point representation having a particular fractional length, based on the determined PDF type.

Particularly, the processor 110 may obtain a statistically maximum value $X_{max}$ and a statistical minimum value $X_{min}$ of the parameters in the statistical distribution based on the determined PDF type, and determine the fixed-point representation capable of statistically covering the floating-point values of the range between the statistical maximum value $X_{max}$ and the statistical minimum value $X_{min}$. At this time, the fractional length may be determined along with the quantization level. In an example, the processor 110 may determine the fractional length of the fixed-point representation with a goal of minimizing the quantization error while the number of bits representing the fixed-point representation is fixed.

The statistical maximum value $X_{max}$ and the statistical minimum value $X_{min}$ may be values based on a range that reduces the quantization error. According to the present example, the statistical maximum value $X_{max}$ and the statistical minimum value $X_{min}$ may be variously defined. For example, the statistical maximum value $X_{max}$ and the statistical minimum value $X_{min}$ may correspond to an actual maximum parameter value and an actual minimum parameter value of the parameters in the statistical distribution according to the determined PDF type. Alternatively, the statistical maximum value $X_{max}$ and the statistical minimum value $X_{min}$ may be an upper and a lower limit of the range which reduces the quantization error stochastically and is based on the average and, the variance or a standard deviation of the statistical distribution according to the determined PDF type. Specific methods (e.g., an optimum delta, etc.) of calculating an optimum range to reduce the quantization error from the determined PDF type are not limited to the examples disclosed herein. The present examples may apply such methods to determine a fixed-point representation appropriate for the statistical distribution, according to a given determined PDF type.

In operation 540, the processor 110 may generate a quantized neural network of the fixed-point type, based on the determined fixed-point representation for each channel. For example, the processor 110 quantizes the floating-point parameters of a channel 1 into the fixed-point representation having a fractional length, in which the distribution range of the floating-point parameter values of the channel 1 may statistically be covered, based on the determined fixed-point representation of channel 1. In addition, the processor 110 quantizes the floating-point parameters of the remaining channels into the fixed-point representation of fractional lengths which statistically cover the floating-point parameters of the remaining channels. That is, quantization of the parameter of the floating-point type into the parameter of the fixed-point is performed on a channel unit included in a layer of a neural network. In this manner, accuracy loss may be reduced compared to a case where quantization is performed on a layer unit, based on the quantization performed on the channel unit. In addition, when the neural network is quantized according to the method described above, a high accuracy may be obtained without re-training the quantization result, since an optimized PDF type is determined for each channel.

In one example, the activations used in each channel included in each of the output feature maps based on the type of the first dataset input into the pre-trained neural network may vary. However, the stochastic distribution of the weights included in each of the kernels may be predetermined in the process of generating a pre-trained neural network. Therefore, the processor 110 may not perform the operations described above for weights. The processor 100 may obtain a maximum value of the weights included in each of the kernels from data of the pre-trained neural network and perform the quantization on weights in the method of determining the fractional length of the fixed-point representation, to represent weights based on the obtained maximum value. However, the present disclosure is not limited to thereto.

Figure 7:
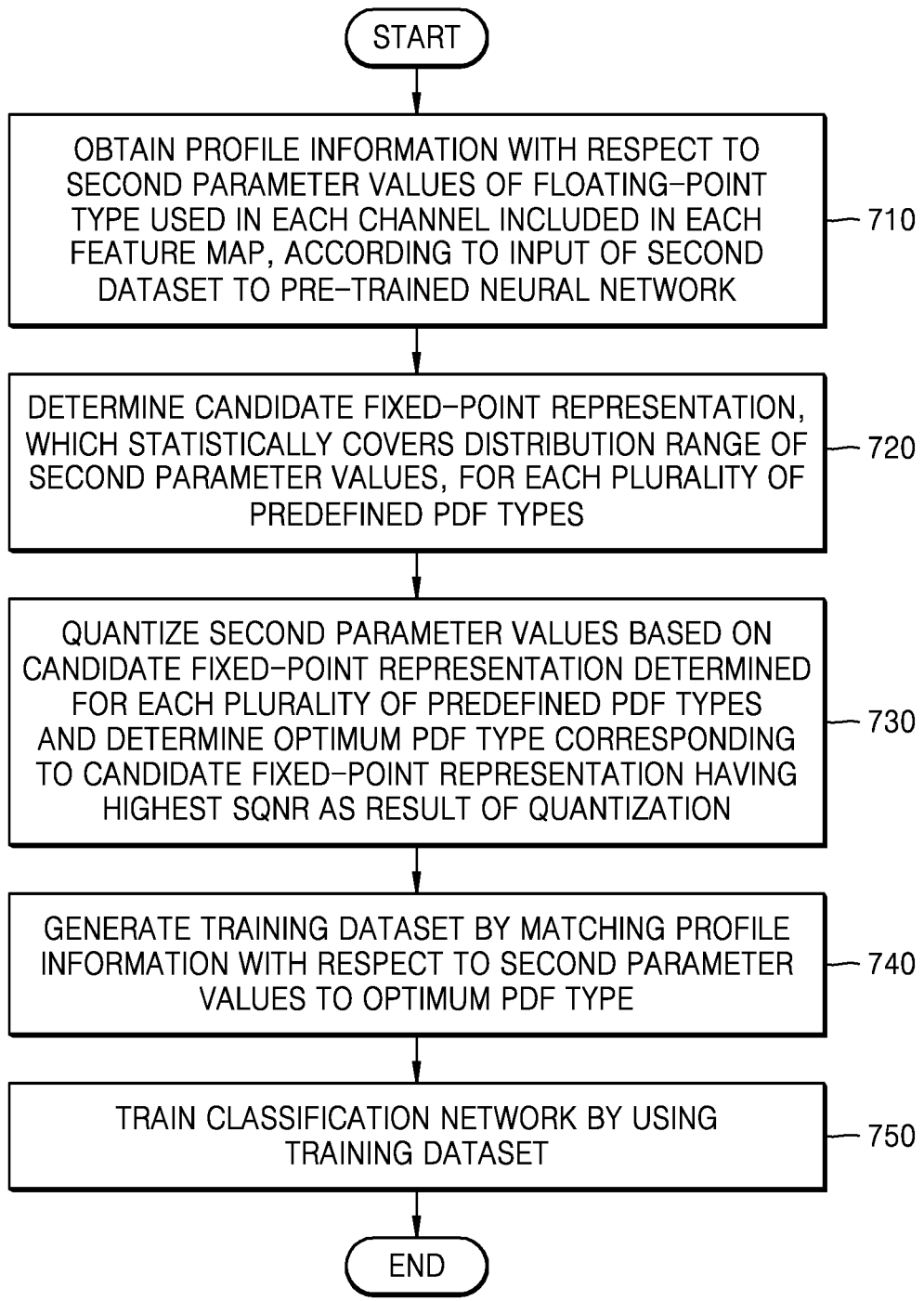
FIG. 7 is a flowchart of a method of training a classification network according to one or more examples.

FIG. 7 is a flowchart of a method of training a classification network according to one or more examples.

The method of FIG. 7 may be performed by the processor 110 of the neural network apparatus 10 described above. In addition, the present example is not limited to thereto, and the method of FIG. 7 may be performed by a separate external device. The processor 110 of the neural network apparatus 10 may receive a trained classification network in the separate external device and perform the method of FIG. 5 using the received classification network. Hereinafter, although the processor 110 of the neural network apparatus 10 is described as performing the method of FIG. 7, those skilled in the art may easily understand that a subject performing the method of FIG. 7 may vary.

In operation 710, the processor 110 may obtain the profile information with respect to the second parameter values of the floating-point type used in each channel included in each of the feature maps, based on the input of the second dataset to the pre-trained neural network. The second dataset may be a trained dataset, which has been used to train the pre-trained neural network before the quantization is performed. For example, the second dataset may correspond to the image samples of less than a predetermined number. The second dataset may be a different dataset than the first dataset. However, the second dataset is not limited thereto, and the second dataset may be a same dataset as the first dataset.

The profile information with respect to the second parameter values may include any one or any combination of any two or more of an average, a variance, an expected value, a skewness, a kurtosis, a hyper-skewness, and a hyper-kurtosis of the second parameter values. The profile information with respect to the second parameter values may be determined based on a network model, layer parameters and the second dataset of the pre-trained neural network.

In operation 720, the processor 110 may determine a candidate fixed-point representation, which statistically covers the distribution range of the second parameter values, for each of the plurality of PDF types. For example, the processor 110 may determine the first candidate fixed-point representation, which statistically covers the distribution range of the second parameter values, assuming that the probabilistic distribution of the second parameter values follows the Laplace distribution. In addition, the processor 110 may determine a second candidate fixed-point representation, which statistically covers the distribution range of the second parameter values, assuming that the probabilistic distribution of the second parameter values follows the hyperbolic secant distribution. Furthermore, the processor 110 may determine each of a candidate fixed-point representation which statistically covers the distribution range of the second parameter values, assuming that the probabilistic distribution of the second parameter values follows each of the remaining PDF types of the plurality of predefined PDF types.

The fact that the processor 110 determines the candidate fixed-point representation which statistically covers the distribution range of the second parameter values may correspond to determining a fractional length of the fixed-point representation such that the quantization error is minimized for each of the plurality of PDF types while the number of bits representing the fixed-point representation is fixed. In one example, the second parameter values may be the activations, which are used in each channel included in each of the feature maps having different values, according to a type of the second dataset input to the pre-trained neural network. In one example, unlike the activations, the processor 110 may determine, for all kernels, the fractional length of the fixed-point representation representing the weights based on the maximum value of the weights, since the type of probabilistic distribution of the weights included in each of the kernels may be predetermined in the process of generating the pre-trained neural network.

In operation 730, the processor 110 may quantize the second parameter values based on the candidate fixed-point representation determined for each of the plurality of predefined PDF types. In addition, the processor 110 may quantize the weights based on the fixed-point representation having a determined fractional length, based on the maximum value of the weights. The processor 110 may determine an optimum PDF type corresponding to the candidate fixed-point representation having the highest signal-to-quantization-noise ratio (SQNR) according to a result of the quantization. The SQNR may indicate a ratio of a signal with respect to the quantization error, and the highest SQNR may indicate the smallest quantization error. As a result, the optimum PDF type may indicate a probabilistic distribution such that the quantization error is reduced when the quantization is performed, assuming that the statistical distribution of the parameter values corresponding to particular profile information is the optimum PDF type. In an example, the processor 110 may measure the SQNR by comparing a quantized neural network with a non-quantized neural network.

In operation 740, the processor 110 may generate a training dataset by matching the profile information with respect to the second parameter values and the optimum PDF type. For example, the processor 110 may generate a data and label pair by matching the profile information with respect to the second parameter values and the optimum PDF type. The data may include information regarding profiled feature maps for each channel (e.g., an average, a variance, a skewness, and/or a kurtosis of the second parameter values included in each channel), and the label may include the optimum PDF type. The generated training dataset may be used to train the classification network.

In operation 750, the processor 110 may train the classification network by using the training dataset. The processor 110 may output the optimum PDF type, which may reduce the quantization error, from the classification network when the quantization of the channel corresponding to the profile information is performed regardless of which profile information is input to the classification network, by training the classification network by using a plurality of training datasets matched with the profile information and the optimum PDF type.

FIG. 8 is a comparison of accuracy losses when comparing results obtained by performing quantization using examples of methods of quantizing parameters of a neural network and a reference quantization method of related art.

Referring to FIG. 8, a simulation result showing accuracy differences between a non-quantized reference network (that is, having a 32-bit floating-point precision) and a quantized neural network based on the quantization methods of some of the disclosed examples for various types of neural networks, and the related art is shown.

In the table shown in FIG. 8, "Layer wise" indicates a case where quantization is performed on the layer, "Channel-wise" indicates a case where quantization is performed on the channel. In addition, "Max" indicates a case where quantization is performed based on the maximum value of the parameter values, "Laplace" indicates a case where quantization is performed assuming that the statistical distribution of the parameter values is a Laplace distribution, "S. Cauchy" indicates a case where quantization is performed assuming that the statistical distribution is a super Cauchy distribution.

In one example, "PDF-aware" indicates a case where quantization is performed by deriving a PDF which is the determined most appropriate for the statistical distribution of the parameter values and corresponds to the quantization method according to some embodiments.

Referring to FIG. 8, generally, accuracy loss is less when the quantization of the channel is performed as compared to the quantization of a layer. Further, even when quantization of the channel is performed, based on the simulation, average accuracy loss is less when the quantization is performed using the quantization method "PDF-aware," according to some examples. Thus, based on the method of quantizing the parameters of a neural network of the present disclosure, accuracy loss may be reduced even if only a relatively small number of image samples are used, and a re-training process for fine-tuning is not performed.

Figure 9:
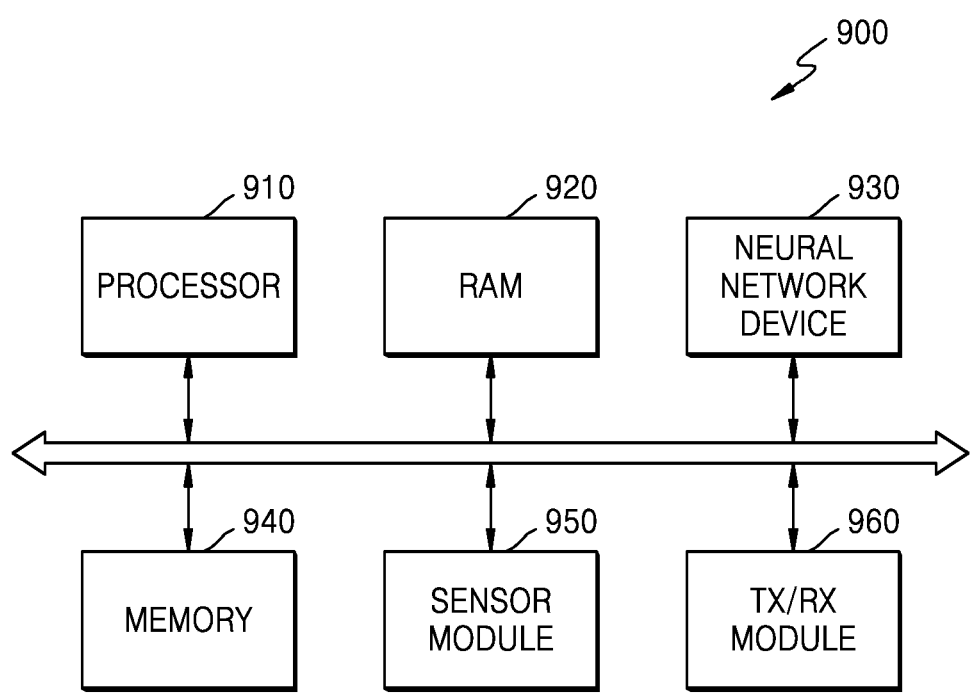
FIG. 9 is a block diagram of one or more examples of a configuration of an electronic system.

FIG. 9 is a block diagram of an example of a configuration of an electronic system.

Referring to FIG. 9, an electronic system 900 may extract valid information by analyzing the input data in real time based on the neural network and determine a situation based on extracted information, or the electronic system 900 may control the elements of an electronic device on which the electronic system 900 is mounted. For example, the electronic system 900 may be applied to a robot device such as a drone and an advanced drivers assistance system (ADAS), a smart TV, a smartphone, a medical device, a mobile device, an image display device, a measurement device, an IoT device, or the like. In addition, the electronic system 900 may be mounted on at least one of various other types of electronic devices The electronic system 900 may include a processor 910, a RAM 920, a neural network apparatus 930, a memory 940, a sensor module 950 and a communication module 960. The electronic system 900 may further include an input/output module, a security module, a power control apparatus, or the like. A portion of the hardware configurations of the electronic system 900 may be mounted on at least one of a semiconductor chip. The neural network apparatus may be the neural network dedicated hardware accelerator as described above or a device including the neural network dedicated hardware accelerator.

The processor 910 controls an overall operation of the electronic system 900. The processor 910 may include one single core or may include a plurality of multi-cores. The processor 910 may process or execute programs and/or data stored in the memory 940. According to an embodiment, the processor 910 may control operations of the neural network apparatus 930, by executing programs stored in the memory 940. The processor 910 may be implemented as a CPU, a GPU, an AP, or the like. The processor 910 may be configured to perform any combination or all operations described herein.

The RAM 920 may store the programs, data, or instructions in real time. For example, the programs and/or data stored in the memory 940 may be temporarily stored in the RAM 920 in accordance with a control or a boot code of the processor 910. The RAM 920 may be implemented as a dynamic RAM (DRAM) or SRAM, or the like.

The neural network apparatus 930 may perform calculations of the neural network based on a received input data and may generate an information signal based on a result of the calculation. The neural network may include a CNN, an RNN, deep belief networks, restricted Boltzmann machines, or the like; the neural network is not limited to thereto. The neural network apparatus 930 may be hardware which performs processing by using a quantized neural network to the fixed-point type described above and correspond to the above-described neural network dedicated hardware accelerator.

The information signal may include one of the various types of recognition signals, such as a speech recognition signal, a subject recognition signal, an image recognition signal, a biometric information recognition signal, or the like. For example, the neural network apparatus 930 may receive a frame data, as an input data, included in a video stream, and generate a recognition signal for an object included in an image represented by the frame data from the same. However, the neural network apparatus 930 is not limited to thereto. The neural network apparatus 930 according to a type or capabilities of an electronic device on which the electronic system 900 is mounted, may receive various types of input data, and generate the recognition signal according to the input data.

The memory 940 is a storage location configured to store data, which may store an operating system (OS), various programs and various data. In an embodiment, the memory 940 may store intermediate results generated in the process of performing the calculation of the neural network apparatus 930, for example, an output feature map may be stored in an output feature list or an output feature matrix form. In an embodiment, the memory 940 may store a compressed output feature map. In addition, the memory 940 may store the quantized neural network data, for example, parameters, a weight map, or a weight list used in the neural network apparatus 930.

The memory 940 may be the DRAM, but the memory 940 is not limited to thereto. The memory 940 may include at least one of a volatile memory or a nonvolatile memory. The nonvolatile memory may include ROM, PROM, EPROM, a flash memory, PRAM, MRAM, RRAM, and FRAM, or the like. The volatile memory includes a dynamic RAM (DRAM), SRAM, SDRAM, PRAM, MRAM, RRAM, and a ferroelectric RAM (FeRAM). In an embodiment, the memory 940 may include at least one of an HDD card, an SSD card, a CF card, an SD card, a micro-SD card, a mini-SD card, an xD-Picture (card, or a memory stick.

The sensor module 950 may collect information about the electronic apparatus on which the electronic system 900 is mounted. The sensor module 950 may sense or receive a signal (e.g., a video signal, a voice signal, a magnetic signal, a biometric signal, and a touch signal, etc.) from the outside of the electronic device, and convert the sensed or received signal into data. By doing so, the sensor module 950 may include at least one of the various types of sensor apparatus, such as a sensing apparatus, for example, a microphone, a photographing apparatus, an image sensor, a light detection and ranging sensor (LIDAR), an ultrasonic sensor, an infrared sensor, a video sensor and a touch sensor, or the like.

The sensor module 950 may provide a converted data, as the input data, to the neural network apparatus 930. For example, the sensor module 950 may include an image sensor, and generate a video stream by photographing an external environment of the electronic apparatus, and provide a successive data frame of the video stream, as the input data, to the neural network apparatus 930 in sequence, However, the present disclosure is not limited thereto, the sensor module 950 may provide various types of data to the neural network apparatus 930.

The communication module 960 may include various wired or wireless interfaces, which are capable of communication with the external device. For example, the communication module 960 may include an interface, or the like, which is connectable to a mobile cellular network, such as a local area network (LAN), a wireless local area network (WLAN) such as a wireless fidelity (WI-FI®), a wireless personal area network (WPAN) such as a Bluetooth (BLUETOOTH®), a wireless universal serial bus (USB), a ZIGBEE®, a near field communication (NFC), a radio-frequency identification (RFID), a power line communication (PLC), or a 3rd generation (3G), a 4th generation (4G), and a long-term evolution (LTE™), or the like.

According to an embodiment, the communication module 960 may receive data relating to the quantized neural network from an external device. Here, the external device may perform training based on an enormous amount of data, such as the neural network apparatus 10 of FIG. 3, quantize the trained neural network into the fixed-point type, and may be a device which provides the quantized neural network data to the electronic system 900. The quantized neural network received may be stored in the memory 940.

The neural network apparatuses, neural network apparatus 10, the processor 110, the memory 120, the electronic system 900, the processor 910, the RAM 920, the neural network apparatus 930, the memory 940, the sensor module 950 and the communication module 960 of FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented neural network method of parameter quantization, comprising:
    obtaining channel profile information for first parameter activation values of a floating-point type in each channel included in each of feature maps based on an input in a first dataset to a floating-point parameters pre-trained neural network, the channel profile information including information associated with a distribution range of the first parameter activation values;
    determining a probability density function (PDF) type, for each channel, appropriate for the channel profile information based on a classification neural network being configured to receive the channel profile information as a dataset and provide, as an output, the PDF type for each channel;

determining a fixed-point representation, based on the determined PDF type, for each channel, statistically covering the distribution range of the first parameter activation values; and performing a channel-wise quantization for each channel of layers of the floating-point parameters pre-trained neural network by generating a fixed-point quantized neural network based on the fixed-point representation determined for each channel, for performing recognition of the input using the generated fixed-point quantized neural network.

2. The method of claim 1, wherein the classification neural network is a neural network trained to select a PDF type determined most appropriate for determining the fixed-point representation for each channel, from among a plurality of predefined PDF types, and the method further comprises training the classification neural network.

3. The method of claim 2, wherein the training of the classification neural network comprises:

obtaining profile information of second parameter activation values of a floating-point type used in each channel included in each of feature maps based on an input in a second dataset to the floating-point parameters pre-trained neural network;

determining a candidate fixed-point representation, for each of the plurality of predefined PDF types, statistically covering a distribution range of the second parameter activation values;

quantizing the second parameter activation values based on the determined candidate fixed-point representation for each of the plurality of predefined PDF types and determining an optimum PDF type corresponding to the candidate fixed-point representation having a highest signal-to-quantization-noise ratio (SQNR) based on a result of the quantization;

generating a training dataset matching the profile information of the second parameter activation values to the optimum PDF type; and training the classification neural network using the training dataset.

4. The method of claim 3, wherein
the determining of the fixed-point representation for each of the plurality of predefined PDF types further comprises determining a fractional length of the fixed-point representation to reduce a quantization error for each of the plurality of predefined PDF types when a number of bits representing the fixed-point representation is fixed.

5. The method of claim 1, wherein the determining of the fixed-point representation further comprises
determining a fractional length of the fixed-point representation to reduce a quantization error when a number of bits representing the fixed-point representation is fixed.

6. The method of claim 1, wherein the first parameter activation values comprise activations of the floating-point type used in each channel included in each of the feature maps.

7. The method of claim 1, wherein the first dataset corresponds to image samples of less than a predetermined number.

8. The method of claim 1, wherein the channel profile information comprises any one or any combination of two or more of an average, a variance, an expected value, a skewness, a kurtosis, a hyper-skewness, and a hyper-kurtosis of the first parameter activation values.

9. The method of claim 1, wherein the generating of the fixed-point quantized neural network further comprises:

obtaining a maximum value of weights included in each kernel from data of the floating-point parameters pre-trained neural network; and determining a fractional length of the fixed-point representation to represent the weights based on the obtained maximum value.

10. The method of claim 2, wherein the plurality of predefined PDF types comprises any one of or any combination of two or more of: a Laplace distribution, a hyperbolic secant distribution, a logistic distribution, a normal distribution, a raised-cosine distribution, a Wigner distribution, a uniform distribution and a super Cauchy distribution.

11. The method of claim 1, further comprising performing recognition of the input using the generated fixed-point quantized neural network.

12. An apparatus comprising:
a processor configured to:
obtain channel profile information for first parameter activation values of a floating-point type in each channel included in each of feature maps based on an input in a first dataset to a floating-point parameters pre-trained neural network, the channel profile information including information associated with a distribution range of the first parameter activation values;

determine a probability density function (PDF) type, for each channel, appropriate for the channel profile information based on a classification network being configured to receive the channel profile information as a dataset and provide, as an output, the PDF type for each channel;

determine a fixed-point representation, based on the determined PDF type, for each channel, statistically covering the distribution range of the first parameter values; and perform a channel-wise quantization for each channel of layers of the floating-point parameters pre-trained neural network by generating a fixed-point quantized neural network based on the determined fixed-point representation for each channel, for performing recognition of the input using the generated fixed-point quantized neural network.

13. The apparatus of claim 12, wherein the classification network comprises a trained neural network configured to select a PDF type determined most appropriate for determining the fixed-point representation for each channel, from among a plurality of predefined PDF types, and
the processor is configured to train the classification network.

14. The apparatus of claim 13, wherein the processor is further configured to:

obtain profile information of second parameter activation values of a floating-point type used in each channel included in each of the feature maps based on an input in a second dataset to the floating-point parameters pre-trained neural network;

determine a candidate fixed-point representation statistically covering a distribution range of the second parameter activation values for each of the plurality of predefined PDF types;

quantize the second parameter activation values based on the determined candidate fixed-point representation for each of the plurality of predefined PDF types and determine an optimum PDF type corresponding to the candidate fixed-point representation having a highest signal-to-quantization-noise ratio (SQNR) based on a result of the quantization;

generate a training dataset matching the profile information of the second parameter activation values to the optimum PDF type; and train the classification network using the training dataset.

15. The apparatus of claim 14, wherein the processor is configured to determine a fractional length of the fixed-point representation to reduce a quantization error for each of the plurality of predefined PDF types when a number of bits representing the fixed-point representation is fixed.

16. The apparatus of claim 12, wherein the processor is configured to determine a fractional length of the fixed-point representation to reduce a quantization error with fixed number of bits representing the fixed-point representation.

17. The apparatus of claim 12, wherein
the first parameter activation values comprise activations of a floating-point type used in each channel included in each of the feature maps.

18. The apparatus of claim 12, wherein the first dataset corresponds to image samples of less than a predetermined number.

19. The apparatus of claim 12, wherein the channel profile information comprises any one of or any combination of two or more of an average, a dispersion, an expected value, a skewness, a kurtosis, a hyper-skewness and a hyper-kurtosis of the first parameter activation values.

20. The apparatus of claim 12, wherein the processor is configured to:
obtain a maximum value of weights included in each kernel from data of the floating-point parameters pre-trained neural network; and
determine a fractional length of the fixed-point representation to represent the weights based on the obtained maximum value.

21. The apparatus of claim 13, wherein the plurality of predefined PDF types further comprise any one of or any combination of two or more of: a Laplace distribution, a hyperbolic secant distribution, a logistic distribution, a normal distribution, a raised-cosine distribution, a Wigner distribution, a uniform distribution and a super Cauchy distribution.

22. The apparatus of claim 12, wherein the processor is further configured to perform recognition of the input using the generated fixed-point quantized neural network.

23. The apparatus of claim 12, further comprising a memory storing instructions, which when executed by the processor causes the processor to:
perform the obtaining of the channel profile information;
perform the determining of the probability density function (PDF) type;
perform the determining of the fixed-point representation; and
perform the generating of the fixed-point quantized neural network.

* * * * *